Feb. 28, 1967 T. G. HARE 3,306,410

CENTRIFUGAL CLUTCH CONSTRUCTION

Filed Oct. 16, 1964 3 Sheets-Sheet 1

INVENTOR.
Terence G. Hare
BY
*Learman Learman & McCulloch*
ATTORNEYS

Feb. 28, 1967

T. G. HARE 3,306,410

CENTRIFUGAL CLUTCH CONSTRUCTION

Filed Oct. 16, 1964

INVENTOR.
Terence G. Hare
BY
Learman, Learman & McCulloch
ATTORNEYS

Feb. 28, 1967 T. G. HARE 3,306,410
CENTRIFUGAL CLUTCH CONSTRUCTION
Filed Oct. 16, 1964 3 Sheets-Sheet 3

INVENTOR.
Terence G. Hare
BY
Learman, Learman & McCulloch
ATTORNEYS

United States Patent Office 3,306,410
Patented Feb. 28, 1967

3,306,410
CENTRIFUGAL CLUTCH CONSTRUCTION
Terence G. Hare, 1257 Grove Point Drive,
Union Lake, Mich. 48085
Filed Oct. 16, 1964, Ser. No. 404,252
20 Claims. (Cl. 192—105)

This invention relates to a centrifugal friction clutch and more particularly to a clutch having a pair of relatively rotatable parts which may be coupled and uncoupled automatically in response to rotation of one of the parts.

Centrifugal clutches of the general class to which the invention relates have been proposed heretofore. For example, clutches of the same general class are disclosed in my prior Patents Nos. 2,762,484, 2,758,690, and 2,765,063. The previously patented clutches are reliable and efficient but for some purposes are too expensive. One of the principal objects of this invention, therefore, is to provide a clutch construction which retains the advantageous characteristics of the previously patented clutches, but which is more economical.

Another object of the invention is to provide a clutch construction having a plurality of clutch actuating elements that are independent of one another and which are responsive to centrifugal force to effect engagement of the clutch parts.

Another object of the invention is to provide a plurality of independent elements for a clutch mechanism and in which the clutching elements cooperate with one another in such manner as to implement the normal centrifugal force to which they are subjected and thereby more forcibly engage the clutch parts.

A further object of the invention is to provide a clutch mechanism having actuating elements which may be operated independently of the centrifugal force to which they are subjected so as selectively to effect engagement or disengagement of the clutch parts.

Another object of the invention is to provide a centrifugal clutch construction in which the use of springs may be avoided, if desired, or in which the number of springs utilized is quite small.

A further object of the invention is to provide a clutch construction of the character described which lends itself to use as a unidirectional or two-way clutch.

Other objects and advantages of the invention will be pointed out specifically or will become apparent from the following description when it is considered in conjunction with the appended claims and the accompanying drawings, in which:

Figure 1:
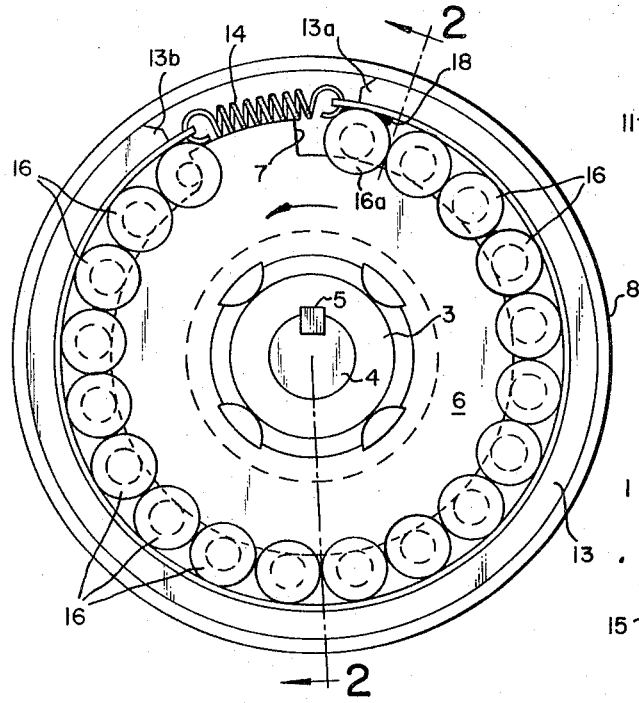
FIGURE 1 is a side elevational view of a clutch constructed in accordance with one embodiment of the invention.
Figure 2:
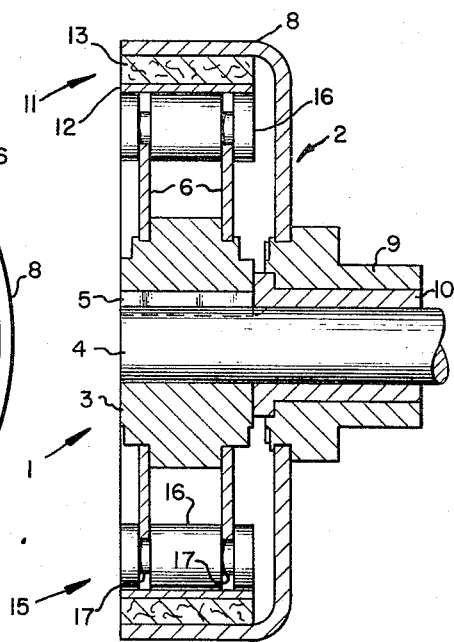
FIGURE 2 is a sectional view taken on the line 2—2 of FIGURE 1.
Figure 3:
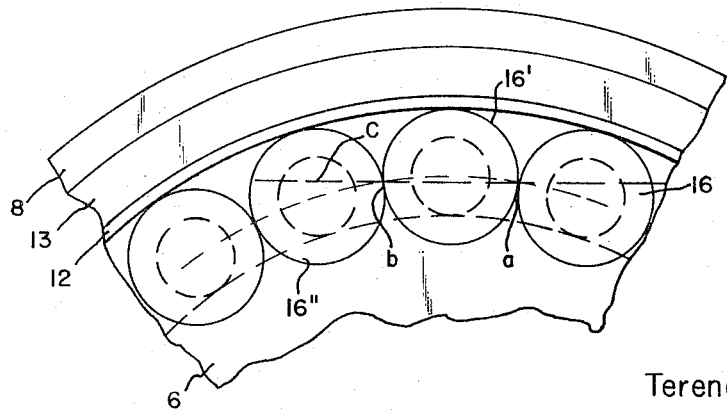
FIGURE 3 is a fragmentary, enlarged side elevational view of a portion of the apparatus shown in FIGURE 1.

A clutch constructed in accordance with the embodiment disclosed in FIGURES 1, 2, and 3 comprises concentric, coaxial, relatively rotatable inner and outer parts 1 and 2, respectively, which are adapted to be rotated in unison in response to rotation at a predetermined speed of the inner unit 1. The inner unit comprises a hub 3 that may be fixed to a shaft 4 by means of a key 5 or the like, the shaft 4 being rotated by a prime mover of any suitable kind (not shown). Fixed to the hub 3 in any suitable manner is one or more, and preferably a pair, of spaced apart, substantially annular plates 6, each of which has a radially extending, force applying or driving projection 7 thereon. The projections 7 are axially aligned with one another. The arrangement is such that rotation of the shaft 4 will effect rotation of the inner clutch part 1 relative to the outer clutch part 2.

The outer clutch part 2 comprises a substantially cup-shaped drum 8 that is suitably secured to a sleeve member 9 which may be rotatably journaled on the shaft 4 by means of a bearing 10. The drum or the sleeve member, or both, may be fixed to a part to be rotated.

Interposed between the clutch parts 1 and 2 is a flexible clutch band 11 comprising a preferably resilient, metal strap 12 to the radially outer surface of which is bonded or otherwise suitably fixed a friction lining 13 formed of a conventional brake lining material, for example. The length of the strap 12 is such that the opposite ends 13a and 13b of the latter are spaced from one another when the parts are assembled.

Preferably, the strap 12 is formed to a diameter smaller than the diameter of the drum 8, thereby having a normal tendency to prevent engagement between the drum and the lining 13. In this arrangement there would be no need to provide additional spring means tending to reduce the diameter of the band. In the disclosed embodiment, however, each end of the strap 12 is provided with an opening in which the adjacent end of a tension spring 14 is accommodated. This arrangement is such that the spring 14 constantly exerts a force on the opposite ends of the band 11 tending to reduce the diameter of the latter and functions to maintain the friction material 13 radially inward and out of engagement with the drum 8.

The apparatus includes a plurality of separate or independent force transmitting elements 15 circumferentially interposed between the inner clutch part and the band 11. Each element 15 comprises a generally cylindrical roller 16 having peripheral grooves 17 to accommodate the edges of the members 6. At one end of the band 11 the terminal roller 16a is fixed to the strap 12 by welding 18 or the like so as to constitute a stop. The other rollers 16 are in abutting engagement with one another, but otherwise are independent of each other. The rollers 16 extend circumferentially around the member 6 from the stop member 16a toward the opposite end of the band 11. The number of rollers is such as to occupy completely the space between the stop roller 16a and the driving projections 7, but provide for sufficient clearance between the projections 7 and the stop 16a as to permit radial contraction of the band 11 under influence of the spring 14 an amount sufficient to permit relative rotation between the members 1 and 2.

In the operation of the apparatus described thus far, rotation of the shaft 4 counterclockwise, as viewed in FIGURE 1, will cause the driving projections 7 on the inner members 6 to rotate in the counterclockwise direction. The projections 7 will bear against the endmost adjacent roller 16 and, through each of the other free elements 16, exert a force on the stop element 16a tending to rotate the band 11 in a counterclockwise direction. That is, the projections 7 and the elements 15 tend to drive the band 11 in the direction of rotation of the inner clutch member by exerting a pushing force adjacent the trailing end 13b of the band. Applying a pushing force to the trailing end of a split band will cause the leading end 13a of the lining to be forced into engagement with the inner surface of the drum 8, especially if the band has a natural tendency to expand radially, thereby providing resistance to the counterclockwise rotation of the band.

As the speed of rotation of the inner member 1 increases, the free roller elements 16 will be urged radially outwardly by centrifugal force, thereby urging the band 11 radially outwardly toward the inner surface of the drum 8. The driving projections 7 also will exert a force on each of the free elements 16 urging them tightly against the stop element 16a. Since the friction lining 13 will be in engagement with the drum 8, the stop 16a resists the force imposed thereon by the driving projections 7 and exerts a counter force on the elements 16. Inasmuch as the confronting surfaces of any two elements 16 are convexly arcuate, the engagement of one element 16 with its adjacent element will be at a point which is tangential to the surfaces of the two elements. For example, the point of engagement between the element 16 in FIGURE 3 and the element 16' is the point a. Similarly, the point of engagement between the element 16' and the element 16" is the point b. The rollers 16, 16' and 16" are arranged on the arc of a circle passing through the geometric center of each roller. Since the transmission of force by any one element, such as the element 16', must be transmitted along a straight line rather than on the arc of the circle, the transmission of force by the element 16' must be along straight line c connecting the points a and b. The line c is a chord which is radially inward of the geometric center of the element 16'. The force exerted by the rollers on opposite sides of the roller 16', therefore, tends to squeeze or wedge the roller 16' outwardly toward the band 11. The same result obtains for each of the other independent or free rollers. The force exerted by the driving members 7 and counteracted by the stop 16a, therefore, produces a force on the elements 16 which has the net effect of urging the elements 16 radially outwardly so as to force the friction lining 13 into engagement with the drum 8 more tightly than could be accomplished by centrifugal force alone. Thus, the clutch construction is self-energizing and effects a positive coupling between the inner and outer members 1 and 2 in response to rotation of the member 1 relative to the member 2.

Figure 4:
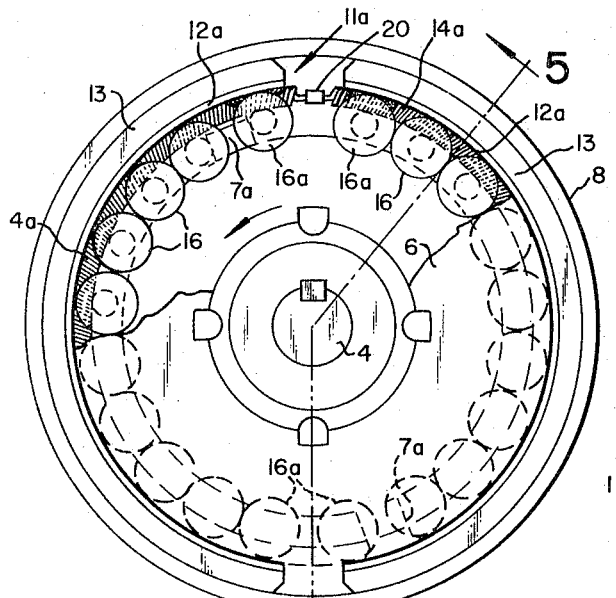
FIGURE 4 is a view similar to FIGURE 1, but illustrating another embodiment of the invention.
Figure 5:
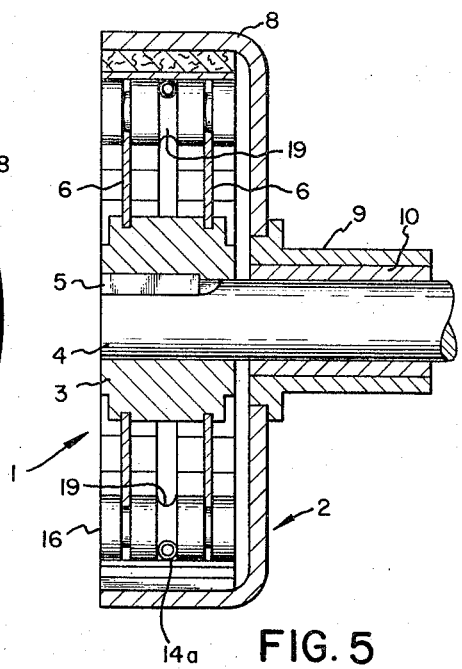
FIGURE 5 is a sectional view similar to FIGURE 2, but illustrating the apparatus shown in FIGURE 4.

The embodiment of the invention shown in FIGURES 4 and 5 is similar to the previously described embodiment and similar parts are designated by similar reference characters. In the modified embodiment, the band 11a is formed of two parts, each of which includes an arcuate shoe 12a on which is bonded or otherwise suitably fixed friction lining material 13. Adjacent each end of each strap is fixed a stop element 16a, and between the stops 16a of each strap is a plurality of independent, free roller elements 16. Each of the roller elements 16, including the stop element 16a, is provided with a centrally located, peripheral groove 19 which accommodates a garter spring 14a that extends completely around the assembled elements 16 and has its opposite ends joined to one another by a clasp 20. Each of the disks 6 of the inner clutch part includes two diametrically opposed force applying or driving projections 7a which function in exactly the same manner as the projections 7 previously described. As is indicated in FIGURE 4, the projections 7a are received between a stop element 16a and the next adjacent element 16 in the direction of rotation of the inner clutch part.

The operation of the apparatus shown in FIGURES 4 and 5 is similar to the operation previously described in that rotation of the shaft 4 counterclockwise, as is viewed in FIGURE 4, will cause corresponding rotation of the inner clutch part, including the disks 6, thereby causing the elements 16 in advance of the projections 7a to be urged radially outwardly and toward the associated stop elements 16a. The counter force exerted on the elements 16 by the stop elements 16a will cause the elements 16 to be wedged radially outwardly, in the same manner previously described, so as to couple the inner and outer clutch parts together.

Figure 6:
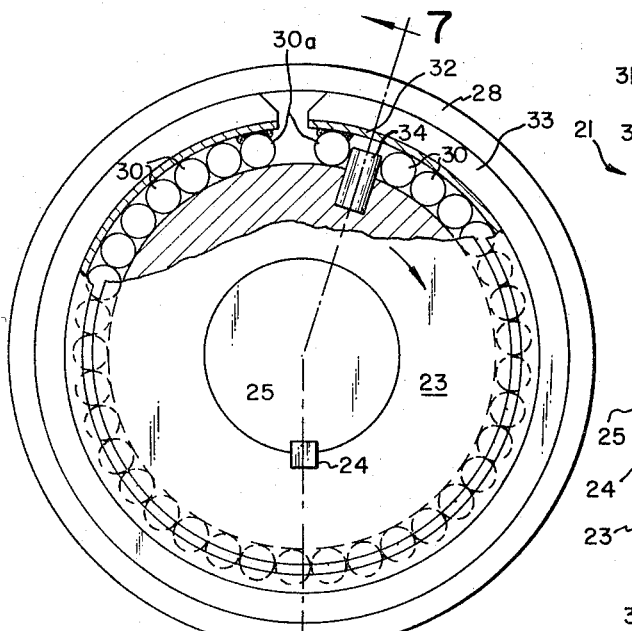
FIGURE 6 is a side elevational view of another embodiment of the invention.
Figure 7:
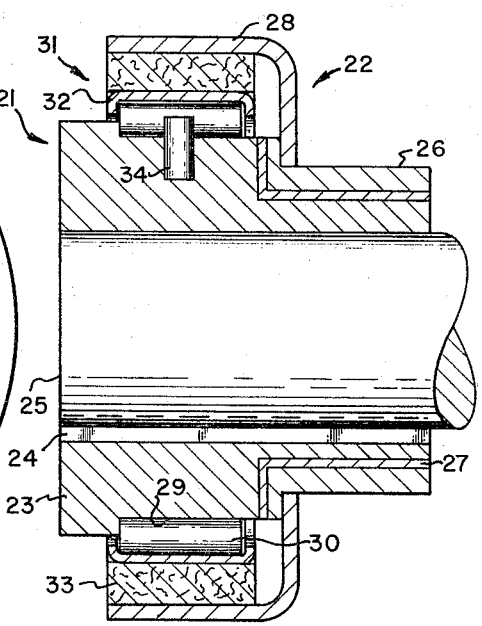
FIGURE 7 is a sectional view taken on the line 7—7 of FIGURE 6.

The apparatus shown in FIGURES 6 and 7 is similar in operation to the previously described embodiments, but differs in certain structural details. The apparatus shown in FIGURES 6 and 7 comprises an inner clutch part 21 and an outer clutch part 22, the two parts being rotatable relatively to each other. The inner part 21 comprises a hub 23 which is keyed as at 24 to a driven shaft 25. The outer part 22 comprises a flanged sleeve 26 that is journaled on the hub 23 by a bearing 27. A cup-shaped drum 28 is fixed to the sleeve 26 for rotation with the latter.

The periphery of the hub 23 is grooved as at 29 to accommodate between itself and the drum 28 a plurality of cylindrical force transmitting roller elements 30. Between the roller elements 30 and the drum 28 is a flexible band 31 comprising a generally channel-shaped strap 32 to which may be bonded or otherwise suitably fixed brake lining material 33 that is adapted to engage the inner surface of the drum 28. Alternatively, the lining 33 may be fixed to the inner surface of the drum.

As is indicated in FIGURE 6, the opposite ends of the band 31 do not meet, but lie fairly closely to one another. as also is indicated in FIGURE 6, the number of roller elements 30 is such as to correspond substantially to the entire length of the band, except for a gap in which is accommodated a force applying or driving pin 34 that projects radially from the hub 23. Except for the rollers adjacent the opposite ends of the band, all of the rollers are independent of each other and are freely rotatable. The end rollers, therefore, constitute stops and are identified by the reference characters 30a.

Depending on the location of the driving pin 34 with respect to the end elements 30a, the clutch can be conditioned for clockwise or counterclockwise rotation. When the parts are assembled as is indicated in FIGURE 6, the clutch is conditioned for clockwise rotation. Should the inner and outer clutch parts be so oriented that the driving pin 34 is in engagement with the left hand stop roller 30a, however, the clutch then would be conditioned for counterclockwise rotation. Should the pin 34 be located midway between the end elements 30a, the clutch would be capable of functioning in response to either direction of rotation.

The construction of the band 31 is such that it normally resists radial enlargement or expansion. Consequently it is not necessary to provide a spring between its two ends, although such a spring may be utilized if desired. It is to be understood, however, that this embodiment may utilize bands of the kind previously described, and vice versa.

The operation of the modified clutch is substantially the same as has been described heretofore. That is, rotation of the inner clutch part 21 clockwise, as is viewed in FIGURE 6, will cause the driving pin 34 to exert a clockwise force on the elements 30, which force will be resisted by the trailing stop member 30a. The resultant force thereby exerted on the elements 30 will cause them to be wedged radially outwardly, supplementing the centrifugal force to which the elements are subjected, thereby forcibly urging the friction lining 33 into coupling engagement with the drum 28.

Figure 9:
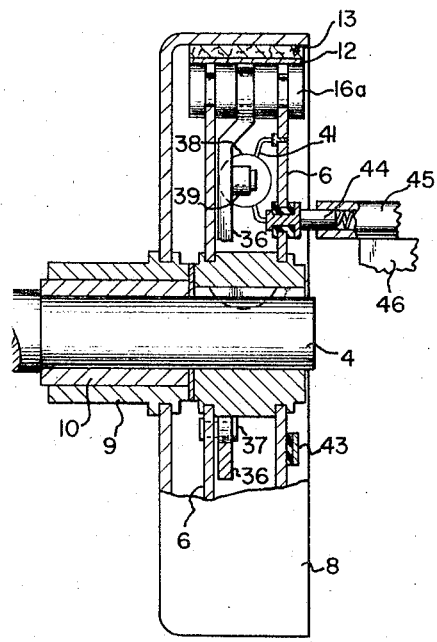
FIGURE 9 is a sectional view of the construction shown in FIGURE 8.
Figure 8:
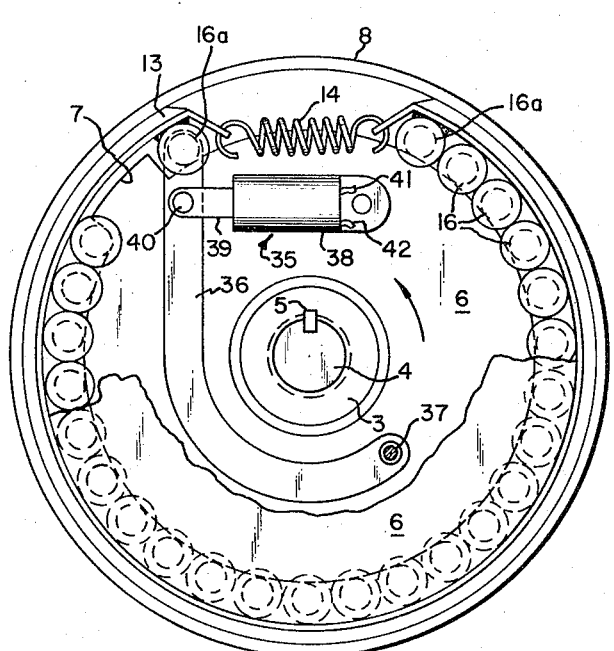
FIGURE 8 is a side elevational view of another embodiment of the invention.

The embodiment of the invention shown in FIGURES 8 and 9 is similar in many respects to the embodiment disclosed in FIGURES 1, 2, and 3. The principal difference between the two embodiments is that the band 11 includes a fixed stop element 16a adjacent each of its ends to one of which is pivoted one end of a lever arm 36, the other end of which is pivoted as at 37 to a disk 6. On the same disk is pivotally mounted an electrical impulse device or solenoid 35 having a winding 38 in which is received a core 39 that is pivoted as at 40 to the arm 36. One terminal of the solenoid winding is grounded to the other disk 6 by a wire 41 and the other terminal of the winding is connected by a wire 42 to a conductive collecting ring 43 that is insulated from the disk 6. In engagement with the collecting ring 43 is a brush 44 mounted in a support 45, and spring biased toward the ring 43. The brush and brush support form parts of known apparatus for supplying electrical energy to the solenoid winding via the ring 43. The apparatus 45 may be supported adjacent the clutch on any convenient mounting member 46.

In the operation of the apparatus shown in FIGURES 8 and 9, rotation of the shaft 4 counterclockwise will cause the driving projections 7 on the disks 6 to effect coupling engagement between the inner and outer clutch parts in the same manner described in connection with the embodiment shown in FIGURES 1 and 2. If it should be desired for any reason to disengage the clutch parts, electrical energy may be supplied to the solenoid winding 38, via the collecting ring 43, so as to energize the winding and retract the plunger 39 into the winding. Retraction of the plunger will effect clockwise rocking of the lever 36 about the pivot 37, thereby reducing the diameter of the band 11 and effecting disengagement between the friction winding 13 and the inner surface of the drum 8.

If desired, it would be possible to construct the solenoid 35 in such manner that energization of its winding would cause the plunger 39 to be projected, in which event actuation of the solenoid would, when the parts are assembled in the manner disclosed in FIGURE 8, effect clutching engagement between the inner and outer clutch parts.

Figure 10:
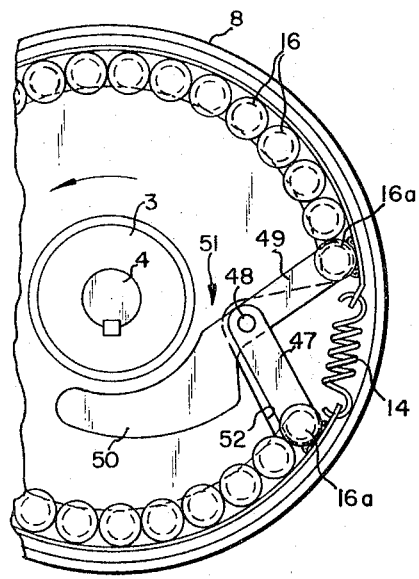
FIGURE 10 is a side elevational view of still another embodiment of the invention.

The embodiment shown in FIGURE 10 is similar in many respects to the embodiment shown in FIGURE 8, but does not necessarily include any electrical apparatus. Instead, one stop element 16a is pivoted to one end of a link 47, the opposite end of which is pivoted as at 48 to an intermediate portion of a lever 49. One end of the lever 49 is pivoted to the other stop element 16a and its other end is free, but is relatively heavily weighted by an enlargement 50. The arrangement is such that the parts 47, 48, and 49 constitute a force applying toggle linkage 51 which, in response to counterclockwise rotation of the shaft 4, tends to elongate by reason of the weight 50 being urged radially outwardly by centrifugal force, As the toggle linkage elongates, the leading end of the friction lining 13 is quickly and forcibly urged into coupling engagement with the inner surface of the drum 8. In order to permit free action of the toggle linkage, each of the discs 6 is notched as at 52 so as to avoid any interference with the toggle linkage.

If it should be desired to effect uncoupling of the inner and outer clutch parts of the embodiment shown in FIGURE 10, it would be possible to incorporate with the latter a solenoid such as is disclosed in FIGURE 8. In this instance, however, the operating plunger of the solenoid would be connected to the lever 48 in such manner as to cause the pivot to move radially inwardly upon energization of the solenoid.

Figure 11:
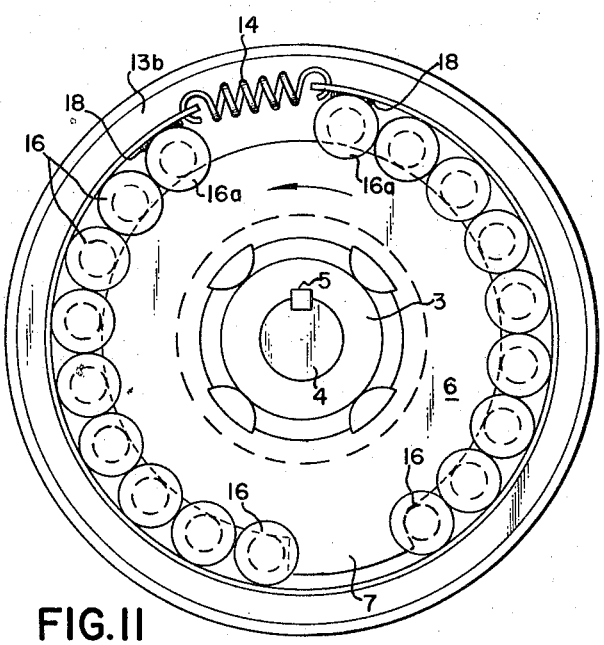
FIGURE 11 is a view similar to FIGURE 1, but illustrating an embodiment capable of functioning as a two-way clutch.

The construction disclosed in FIGURE 11 is similar to that illustrated in FIGURE 1, the principal differences being that the band 11 is provided with a fixed stop 16a adjacent each of its ends, and the force applying members 7 are so oriented as to project between the band and the inner member 1 in a position substantially midway between the ends of the band. Between the members 7 and each stop 16a is a plurality of independent rollers 16, the number of rollers on each side of the members 7 being such as to occupy the space between the latter and the adjacent stop member.

In the FIGURE 11 embodiment, rotation of the inner member in either a clockwise or counterclockwise direction will cause those rollers leading the members 7 to be urged radially outwardly as aforesaid so as to engage the inner and outer clutch parts 1 and 2. The construction and arrangement of this embodiment, therefore, are such as to provide a two-way or double acting clutch.

The disclosed embodiments are illustrative of presently preferred forms of the invention, but are intended to be illustrative rather than definitive thereof. The invention is defined in the claims.

I claim:

1. A clutch construction comprising inner and outer relatively rotatable members; a flexible friction band interposed between said members; a plurality of separate elements interposed circumferentially between said band and said inner member in abutting engagement with one another and otherwise being independent of each other; and force applying means operable in response to rotation of one of said members to act on said elements and urge them radially outwardly and circumferentially to maintain said elements in abutting engagement notwithstanding said radially outward movement thereof.

2. A clutch construction comprising inner and outer relatively rotatable members; a flexible friction band interposed between said members; stop means carried by said band; a plurality of separate elements interposed between said band and said inner member, one of said elements being in engagement with said stop means and the remaining elements being in abutting engagement one with another and said elements otherwise being independent of each other; and force applying means operable in response to rotation of said inner member to force said remaining elements radially outwardly and simultaneously toward said stop means to maintain said elements in said abutting engagement notwithstanding their radially outward movement.

3. A clutch construction comprising concentric inner and outer relatively rotatable members; a concentric friction band interposed therebetween; stop means carried by said band; a plurality of separate force transmitting members interposed circumferentially between said band and said inner member, one of said members engaging said stop means and the remaining members abutting one another; and force applying means carried by said inner member and engaging a force transmitting member circumferentially remote from said stop means for exerting a force thereon tending to effect movement of said remote force transmitting member and said remaining members radially outwardly and simultaneously toward said stop means to maintain all of said members in abutting engagement and thereby effect movement of said band into frictional engagement with said outer member.

4. The construction set forth in claim 3 wherein said force applying means comprises a projection on said inner member extending radially toward said outer member.

5. The construction set forth in claim 3 wherein said force applying means comprises a lever arm pivotally connected to said inner member; and actuating means acting on said lever arm for pivoting the latter.

6. The construction set forth in claim 5 wherein said actuating means comprises an electrical impulse device.

7. The construction set forth in claim 3 wherein each of said force transmitting members comprises a rotatable element rotatable about its own axis.

8. The construction set forth in claim 7 wherein each of said rotatable elements is cylindrical in shape.

9. A clutch construction comprising concentric inner and outer relatively rotatable members; a concentric friction band interposed between said members; stop means carried by said band; a plurality of separate, independently rotatable force transmitting elements interposed between said band and said inner member, said elements extending circumferentially of said inner member in engagement with one another and abutting said stop means; and force applying means engaging the element circumferentially remote from said stop means and operable in response to rotation of said inner member to exert a force on each of said force transmitting elements to move them radially outwardly and simultaneously toward said stop means and effect driving engagement between said band and said outer member.

10. The construction set forth in claim 9 wherein said force applying means comprises a lankage device and a weighted member.

11. A clutch construction comprising inner and outer relatively rotatable members; flexible friction means interposed between said members; a stop secured to said friction means; an abutment circumferentially spaced from said stop and carried by said inner member; and a plurality of separate elements interposed between said friction means and said inner member in abutting engagement with one another and otherwise being independent of each other, said elements together occuping the space between said abutment and said stop, the abutting surfaces of said elements being arcuate, said abutment being operable in response to rotation of said inner member to move said elements radially outwardly and simultaneously toward said stop to maintain said elements in abutting engagement.

12. The construction set forth in claim 11 wherein each of said elements is independently rotatable about its own axis.

13. The construction set forth in claim 11 wherein each of said elements is cylindrical in cross-section.

14. A clutch construction comprising inner and outer relatively rotatable members; a flexible friction band interposed between said members and having terminal ends; spring means acting on said flexible band and urging the latter toward said inner member; a stop carried by said band adjacent one end of the latter; an abutment carried by said inner member adjacent the other end of said band; and a plurality of separate elements interposed between said band and said inner member in abutting engagement with each other and otherwise being independent of each other, said elements spanning the distance between said stop and said abutment, said abutment being operable in response to rotation of said inner member to move said elements radially outwardly and simultaneously toward said stop to maintain them in abutting engagement.

15. A clutch construction comprising concentric inner and outer relatively rotatable members; concentric friction band means interposed between said members; a plurality of separate roller members interposed between said inner member and said band means in abutting engagement with one another and otherwise independent of each other, said roller members being movable radially outwardly under centrifugal force; a stop member fixed to said band means and against which one of said roller members abuts; and force applying means in engagement with the roller member remote from said stop member and operable in response to rotation of said inner member to urge said roller members toward said stop member and maintain said roller members in abutting engagement with one another as they move radially outwardly and thereby effect movement of said band means radially outwardly.

16. The construction set forth in claim 15 wherein said band means comprises a pair of shoe members disposed on opposite sides of said inner member.

17. The construction set forth in claim 16 including spring means acting on said shoe members and urging the latter radially inwardly.

18. The construction set forth in claim 15 wherein each of said roller elements is circumferentially grooved and wherein said inner member includes at least one disk member received in the grooves of said roller elements.

19. The construction set forth in claim 15 wherein said inner member is circumferentially grooved and wherein each of said roller elements is accommodated in said groove.

20. A clutch construction comprising concentric inner and outer relatively rotatable members; concentric, arcuate friction band means interposed between said members; stop means fixed to said band means adjacent each end thereof; force applying means carried by said inner member and having a part projecting between the latter and said band means in a position substantially midway between the ends of said band means; and a plurality of independent elements interposed between said inner member and said band means on each side of said part, the elements on each side of said part abutting one another and occupying the space between the latter and the adjacent stop means, said elements being operable in response to rotation of said inner member to move radially outwardly and said part being operable in response to rotation of said inner member to maintain in abutting engagement those elements between said part and that stop means at the end of said band toward which said part moves.

References Cited by the Examiner

UNITED STATES PATENTS

| | | | |
|---|---|---|---|
| 2,758,690 | 8/1956 | Hare | 192—105 |
| 2,762,484 | 9/1956 | Hare | 192—105 |
| 2,785,782 | 3/1957 | Dodge | 192—45 |

FOREIGN PATENTS 1,005,049  12/1951  France.

DAVID J. WILLIAMOWSKY, *Primary Examiner.*

B. W. WYCHE, *Assistant Examiner.*